United States Patent [19]
Gibson

[11] Patent Number: 5,255,078
[45] Date of Patent: Oct. 19, 1993

[54] IMPULSE NOISE DETECTOR FOR A VIDEO SIGNAL RECEIVER

[75] Inventor: James J. Gibson, Princeton, N.J.

[73] Assignee: RCA Thomson Licensing Corporation, Princeton, N.J.

[21] Appl. No.: 906,186

[22] Filed: Jun. 29, 1992

[51] Int. Cl.$^5$ ............................................. H04N 5/213
[52] U.S. Cl. ...................................... 358/36; 358/167
[58] Field of Search ................. 358/36, 336, 167, 166, 358/31, 37, 905, 11

[56] References Cited

U.S. PATENT DOCUMENTS

| | | | |
|---|---|---|---|
| 4,398,210 | 8/1983 | Liu et al. | 358/36 |
| 4,514,763 | 4/1984 | Rindal | 358/167 |
| 4,926,261 | 5/1990 | Matsumoto et al. | 358/167 |

FOREIGN PATENT DOCUMENTS

| | | |
|---|---|---|
| 61225980 | 10/1989 | Japan . |
| 2-207677 | 8/1990 | Japan . |
| 4-40174 | 2/1992 | Japan . |

Primary Examiner—Victor R. Kostak
Assistant Examiner—Nathan J. Flynn
Attorney, Agent, or Firm—Joseph S. Tripoli; Eric P. Herrmann; Ronald H. Kurdyla

[57] ABSTRACT

An impulse noise detector for detecting impulse noise in video signal includes a band pass filter for passing a band of video signal frequencies centered in the spectral region of video signals which exhibit a relative energy minimum. The band pass filtered signal is applied to a vertical comb filter. A threshold detector is coupled to the output connection of the comb filter for detecting the occurrences of impulse noise.

18 Claims, 2 Drawing Sheets

FIG. 2A
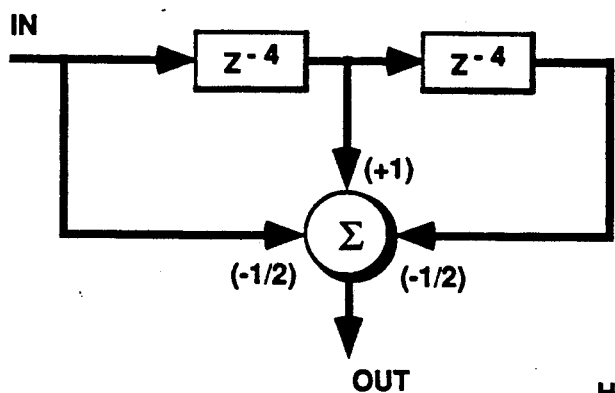
FIG. 2B
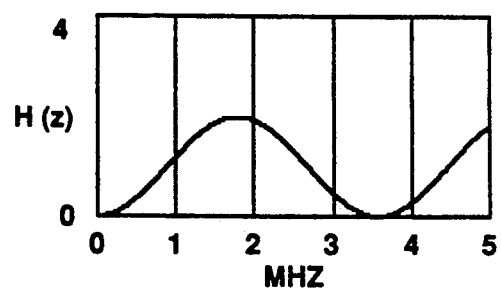
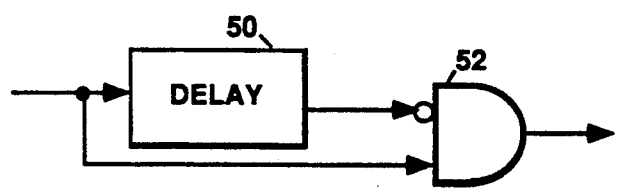
FIG. 3
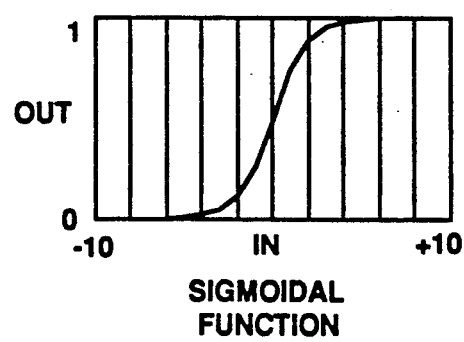
FIG. 4
SIGMOIDAL FUNCTION

IMPULSE NOISE DETECTOR FOR A VIDEO SIGNAL RECEIVER

This invention relates to circuitry for detecting impulse noise in video signals.

BACKGROUND OF THE INVENTION

Impulse noise in video signals is characterized by abrupt signal aberrations of relatively short duration. The energy spectrum of impulse noise contaminating video signals is generally flat over the bandwidth of the video signal. Conversely the energy spectrum of composite video signal is concentrated near DC and the color subcarrier. That is, the luminance component of composite video signals has relatively high energy at low frequencies and tapers off at about one megaHertz. The energy of the chrominance component is centered about the color subcarrier with a bandwidth of about two megaHertz. There exists a spectral region centered at about 1.8 megaHertz having relatively little video signal energy.

The frequency region about 1.8 megaHertz is optimum for detecting impulse noise since there is a minimum of video signal energy in this region. U.S. Pat. No. 4,398,210 teaches that the detection of impulse noise within this spectral region of composite video signal affords the opportunity of detecting impulses having amplitudes within the dynamic range of the composite video signal. The system of U.S. Pat. No. 4,398,210 includes memory apparatus for concurrently providing vertically aligned video signal from three adjacent horizontal lines. These signals are respectively band pass filtered to pass the spectral band centered about 1.8 megaHertz. Filtered signal from the first and third lines are respectively subtracted from filtered signal from the second line. The respective differences are compared against a reference value, and the filtered signal from the second line is also compared to the reference value. The results of the three comparisons are applied to an AND gate to determine the presence or absence of correlation and thereby the absence or presence of impulse noise.

The system of U.S. Pat. No. 4,398,210 has proven to be an effective impulse noise detector, however it tends to be hardware intensive. That is, it requires two full line memories and relatively complex correlation detection circuitry. The present invention overcomes both of these shortcomings.

SUMMARY OF THE INVENTION

The present invention is an impulse noise detector including a band pass filter for passing a band of video signal frequencies centered in the spectral region of video signals which exhibit a relative energy minimum. The band pass filtered signal is applied to a vertical comb filter. A threshold detector is coupled to the output connection of the comb filter for detecting the occurrences of impulse noise.

BRIEF DESCRIPTION OF THE DRAWINGS

FIG. 2A is a block diagram of an exemplary band pass filter arranged to pass the portion of the video signal spectrum located about the video signal energy minimum.

FIG. 2B is a plot illustrating the frequency response of the filter illustrated in FIG. 2A.

FIG. 3 is a block diagram of an exemplary circuitry for reducing the detection of false positive impulse noise occurrences.

FIG. 4 is a plot of an exemplary sigmoidal transfer function.

DETAILED DESCRIPTION

Figure 1:
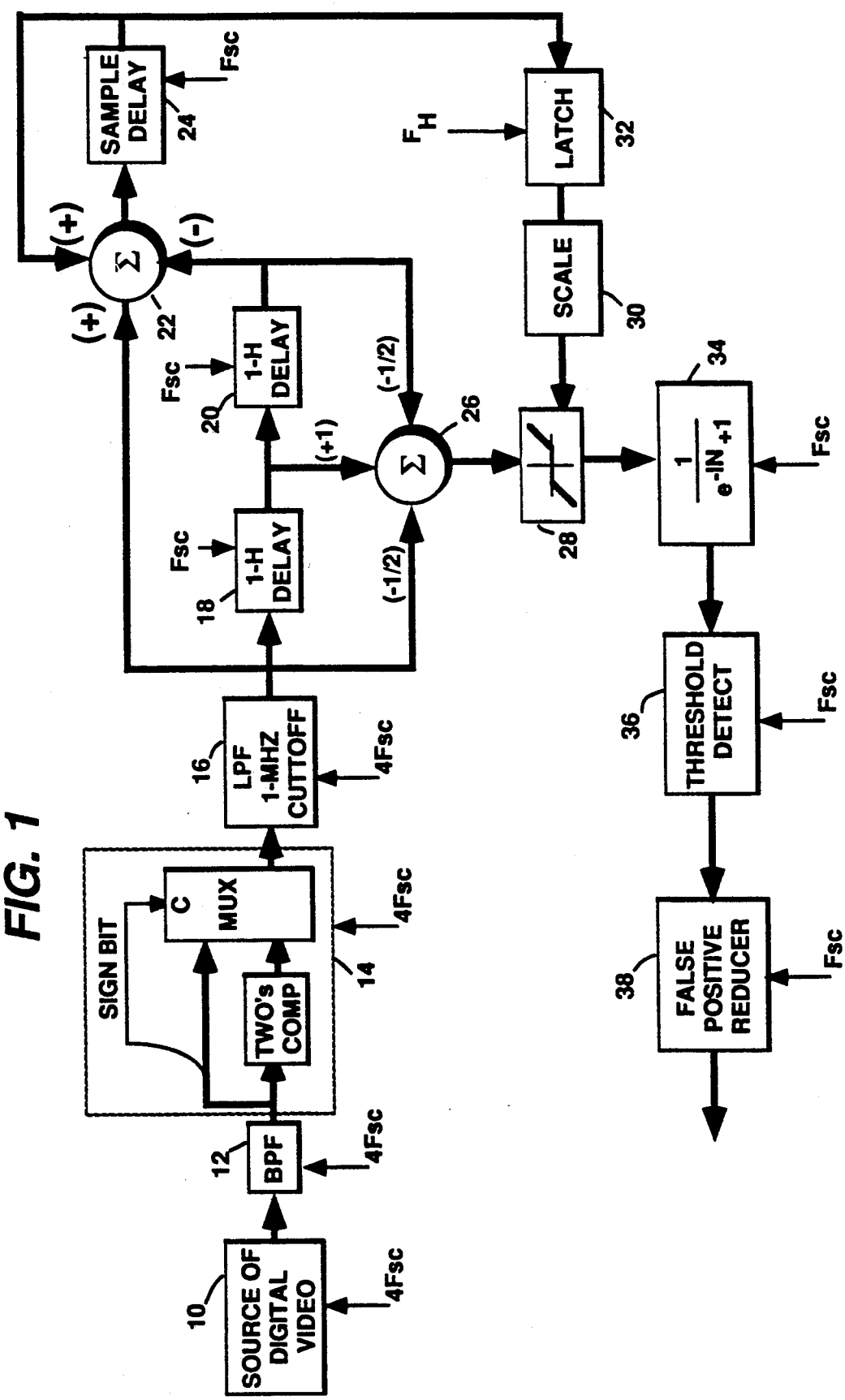
FIG. 1 is a block diagram of an impulse noise detector embodying the present invention.

The invention will be described in terms of digital video signal and digital signal processing circuitry, however, it should readily be appreciated that the invention may be practiced on analog video signals with the appropriate selection of corresponding analog signal processing elements. The video signal is assumed to be in parallel bit two's complement format with samples occurring at four times the color subcarrier frequency ($4f_{sc}$).

Referring to FIG. 1, digital video signal is supplied from a source 10. This source may include a tuner and intermediate frequency circuitry and an analog-to-digital converter for converting broadcast analog video signals to digital form. Alternatively the source 10 may be some type of recording medium and appropriate signal pickup apparatus. The digital video samples from the source 10 are coupled to a band pass filter 12 having a frequency response similar to the frequency response illustrated in FIG. 2B. The center frequency of the band-pass response has been selected to occur around 1.8 megaHertz, or around the energy minimum of the composite video signal. FIG. 2A illustrates an exemplary filter structure which may be implemented for the filter 12. In FIG. 2A the elements designated $z^{-4}$ are delay elements for delaying respective video signal samples by four sample periods. Non-delayed samples and samples delayed by eight sample periods are weighted by factors of $(-\frac{1}{2})$ and applied to a summing circuit wherein they are added to samples delayed by four sample periods. The sums provided by the summing circuit constitute the band pass filtered signal. This particular filter structure, in addition to having a bandpass centered at 1.8 megaHertz, provides a further advantage in that it has a null at 3.58 megaHertz to attenuate the chrominance subcarrier, and thereby to further enhance the sensitivity of the detector for impulse noise within the dynamic range of the video signal.

Referring again to FIG. 1, the band pass filtered signal is applied to an element 14 wherein it is rectified. Element 14 includes a two's complementing circuit, and a multiplexer. Filtered signal is applied to one input of the multiplexer and to the two's complement circuit. The output of the two's complement circuit is applied to the other input of the multiplexer. The sign bit of the band pass filtered signal is coupled to control the multiplexer to pass band-pass filtered signal of a first polarity and to pass two's complemented samples of the band-pass filtered signal exhibiting a second polarity. Alternatively a squaring circuit may be implemented to effectuate the rectification.

Nominally the IF circuitry of a television receiver will tend to cause noise impulses to ring or exhibit a burst-like signal. The rectification provided by element 14 tends to reconstruct this burst-like signal into a pulse.

Rectified signal from element 14 is coupled to a low-pass filter 16 which has a cutoff frequency of about 1 megaHertz. This low-pass filter 16 will further reduce higher frequency components passed by the band-pass filter 12, and will tend to broaden pulses created by noise impulses. Low-pass filtered samples from the filter 16 are coupled to a comb filter including elements 18, 20 and 26. As shown, this is a 2-H type comb filter but a 1-H type comb filter may be utilized in its stead. Elements 18 and 20 each impart a delay of one line interval to the low-pass filtered samples. Non-delayed and 2-H delayed samples are respectively weighted by ($-\frac{1}{2}$) and applied to the summing circuit 26 wherein they are summed with samples delayed by one line interval.

Nominally there is significant vertical redundancy in most video images, however there will very seldom be any vertical redundancy due to impulse noise. Vertical image redundancy (and thus substantially all the video information represented by the samples) will be canceled by the summation performed by the summer 26. If image redundancy only exists between two of the three lines, such cancellation will be reduced to about one-half the value of the difference between lines. Impulse noise (or signal dropouts) generally occur randomly, will be of relatively large amplitude, and will be present in only one of the signals applied to the summer 26 at any one time. As a result, such occurrence will create a relatively large pulse at the output of the summer. These relatively large amplitude pulses may be easily detected.

The sample sums from element 26 are coupled to a coring circuit 28 which eliminates low amplitude values about zero value. The coring circuit thus passes only those values that exceed a predetermined amplitude. This amplitude may be selected such that samples passed by the coring circuit will have a high probability of representing impulse noise rather than residual video signal caused by a lack of vertical image redundancy. The coring depth may be made adaptive as a function of signal amplitude. (If the summing circuit 26 is arranged to provide only the magnitudes of the sums, a subtracter may be substituted for the coring circuit, wherein a predetermined threshold value is subtracted from the sums. This threshold value may be made adaptive if desired as described for the coring control circuit below.)

A summer 22 and a one sample period delay element 24 are arranged as an accumulator to generate a running sum of the sample values occurring over two line intervals. This sum is stored in the latch 32 once each line interval. The latched sum is then weighted and applied as a control signal to the adaptive coring circuit to set the depth of coring for the next successive line interval.

The output of the coring circuit is coupled to a threshold detector 36 which produces a signal having first and second states for samples applied thereto that are greater and lesser than a predetermined value. The signal provided by the threshold detector is an impulse indicating signal.

The cored signal may be coupled to the threshold detector via a device 34 having a sigmoidal transfer function of the form shown in FIG. 4. This function S(in) may be represented mathematically by the equation;

$$S(in) = 1/(e^{-(in-\phi)} + 1)$$

where (in) represents the output from the coring circuit and $\phi$ is a constant. Applying a sigmoidal transfer function to the samples applied to the threshold detector tends to remove some of the uncertainty to impulse detection for samples having values relatively close to the threshold value.

The signal provided by the threshold detector 36 may include some false positives, that is the signal may indicate impulse noise where none actually occurred. These false positives may be removed by performing a frame to frame correlation check, or a line to line correlation check of the impulse detection signal provided by the threshold detector. As indicated it is unlikely that impulses will occur at vertically aligned locations of the signal, and it is even less likely that impulses will occur temporally aligned in successive frames. If impulse indications occur vertically aligned, and/or temporally aligned, it is almost certain that such indications are false positives.

False positives may be reduced or eliminated with circuitry of the type shown in FIG. 3. In FIG. 3 signal from the threshold detector is applied to an input connection of a delay element 50, and to a non-inverting input connection of an AND gate 52. Delayed signal from the delay element 50 is coupled to an inverting input connection of the AND gate 52. (Depending upon whether vertical or temporal correlation will be the criterion for false positive detection, the delay element 50 will comprise a line delay or a frame delay respectively.) Assume that an impulse indication in the input signal is represented by a logic one state. If the input signal exhibits a logic one state and the delayed signal concurrently exhibits a logic zero state the input (impulse indicating) signal is passed by the AND gate, that is when no correlation exists between an impulse indication in the input signal and the delayed signal, the AND gate is enabled to pass the input signal. Conversely if correlation does exist between an impulse indication in the input signal and the delayed signal, the AND gate will be disabled by the logic one value from the delay element being applied to the inverting input connection.

It should be noted that because the $4f_{sc}$ samples are low-pass filtered by a filter (16) having a cutoff of about 1 megaHertz, the samples applied to the comb filter are significantly oversampled. The samples output from the low-pass filter 16 may therefore be subsampled by a factor of e.g., 4 without loss of information. Subsampling the samples provided by the filter 16 permits the use of delay lines 18 and 20 having lesser numbers of delay stages. At sample rates of $4f_{sc}$ the respective delay lines 18 and 20 would require 910 stages of delay or memory stages. Alternatively if the signal is subsampled 4:1 the respective delay lines require only 228 stages of delay. The circuitry following the comb filter may be advantageously operated at one quarter speed, and the amount of delay stages incorporated in the false positive detector/reducer may similarly be reduced.

The storage required of the delay device in the false positive detector may be further reduced by a) lowpass filtering the impulse indicating signal applied to the delay element 50, and b) subsampling the low-pass filtered impulse indicating signal.

What is claimed is:

1. Apparatus for detecting impulse noise in video signals comprising:
   a source of video signal;
   filter means coupled to said source and having a passband centered in the region of the video signal energy minimum which is located between the video signal spectral region containing maximum luminance energy and the spectral region containing maximum chrominance energy, and arranged to substantially attenuate said spectral regions containing maximum luminance energy and maximum chrominance energy;

a subtractive line comb filter coupled to said filter means, for line comb filtering signal passed by said filter means; and means coupled to said line comb filter for providing a signal having first and second states for signal passed by said line comb filter being greater and lesser than a threshold value respectively.

2. The apparatus set forth in claim 1 wherein said line comb filter comprises:

delay means for concurrently providing signal from first, second and third adjacent horizontal lines, said second horizontal line being disposed between said first and third horizontal lines;

means for combining signal from said first and third horizontal lines with signal of reverse polarity from said second horizontal line.

3. The apparatus set forth in claim 1 wherein said line comb filter is coupled to said filter means by signal rectifying means.

4. The apparatus set forth in claim 3 wherein said signal rectifying means comprises a two's complementing circuit.

5. The apparatus set forth in claim 1 further including, circutry for removing signal having amplitudes less than a predetermined amplitude connected between said line comb filter and said means for providing a signal having first and second states.

6. The apparatus set forth in claim 5 wherein said circuitry for removing signal having amplitudes less than a predetermined amplitude is a coring circuit.

7. The apparatus set forth in claim 6 wherein said coring circuit is adaptive with the depth of coring being responsive to said video signal.

8. The apparatus set forth in claim 5 further including circuitry having a sigmoidal transfer function coupled between said circuitry for removing signal having amplitudes less than a predetermined amplitude, and said means for providing a signal having first and second states.

9. The apparatus set forth in claim 8 further including a false positive detector/corrector coupled to an output connection of said means for providing a signal having first and second states.

10. The apparatus set forth in claim 9 wherein said false positive detector/corrector comprises:

further delay means, coupled to said means for providing a signal having first and second states, for delaying signal by an integral number of horizontal line intervals;

means coupled to said means for providing a signal having first and second states and to said further delay means for determining correlation between the first state of signal provided by said delay means and and the first state of signal provided by said means for providing a signal having first and second states, and providing as output signal, signal provided by said means for providing a signal having first and second states only in the absence of correlation of said first state.

11. The apparatus set forth in claim 1 wherein said video signal is composite video signal in conformance with NTSC standards and said filter means coupled to said source has a frequency pass band centered between 1.6 MHz and 2.1 MHz, and a null substantially at the color subcarrier frequency.

12. The apparatus set forth in claim 4 wherein said video signal is composite video signal in conformance with NTSC standards and said filter means coupled to said source has a frequency pass band centered between 1.6 MHz and 2.1 MHz.

13. The apparatus set forth in claim 3 further including low-pass filter means for coupling said rectifying means to said line comb filter.

14. The apparatus set forth in claim 13 wherein said video signal is a sampled signal occurring at a sample rate $f_s$ and said low-pass filter has a cutoff frequency of less than or equal to $f_s/M$, M a positive value, and wherein said line comb filter operates at a subsample sample rate of $f_s/N$, where N is a positive value of less than or equal to M/2 but greater than one.

15. The apparatus set forth in claim 1 further including circuitry having a sigmoidal transfer function coupled between said comb filter, and said means for providing a signal having first and second states.

16. The apparatus set forth in claim 15 further including circuitry for removing signal having amplitudes less than a predetermined amplitude, coupled between said comb filter, and said circuitry having a sigmoidal transfer function.

17. Apparatus for detecting impulse noise in video signals comprising:

a source of video signal;

signal rectifying means coupled to said source and having an output terminal at which rectified video signal is provided;

filter means, coupled to said rectifying means, and having a passband centered in the region of the video signal energy minimum which is located between the video signal spectral region containing maximum luminance energy and the spectral region containing maximum chrominance energy, and arranged to substantially attenuate said spectral regions containing maximum luminance energy and maximum chrominance energy;

a subtractive line comb filter coupled to said filter means, for line comb filtering signal passed by said filter means;

a coring circuit coupled to said comb filter for removing signal from comb filtered signal which is less than a predetermined amplitude; and means coupled to said coring circuit for providing a signal having first and second states for signal passed by said comb filter being greater and lesser than a threshold value respectively.

18. The apparatus set forth in claim 17 further including circuitry having a sigmoidal transfer function coupled between said coring circuitry, and said means for providing a signal having first and second states.

* * * * *